(12) United States Patent
Kish et al.

(10) Patent No.: US 9,240,868 B2
(45) Date of Patent: Jan. 19, 2016

(54) INCREASING RELIABLE DATA THROUGHPUT IN A WIRELESS NETWORK

(75) Inventors: William S. Kish, Saratoga, CA (US);
John Chanak, Saratoga, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 871 days.

(21) Appl. No.: 11/267,477

(22) Filed: Nov. 4, 2005

(65) Prior Publication Data

US 2006/0098616 A1    May 11, 2006

Related U.S. Application Data (60) Provisional application No. 60/625,331, filed on Nov. 5, 2004.

(51) Int. Cl.
*H04B 7/14* (2006.01)
*H04L 1/16* (2006.01)
(Continued)

(52) U.S. Cl.
CPC .............. *H04L 1/1607* (2013.01); *H04L 69/16* (2013.01); *H04L 69/163* (2013.01); *H04L 2001/0097* (2013.01); *H04W 28/06* (2013.01);
(Continued)

(58) Field of Classification Search
CPC ....... H04L 1/18; H04L 1/1858; H04L 1/1896; H04L 1/16; H04L 1/1635; H04L 69/16; H04W 80/06; H04W 88/04
USPC ......... 370/229, 235, 236, 315, 328, 338, 400, 370/401, 428, 492, 501
See application file for complete search history.

(56) References Cited

U.S. PATENT DOCUMENTS

| | | |
|---|---|---|
| 1,653,664 A | 12/1927 | Kirkup |
| 4,176,356 A | 11/1979 | Foster et al. |

(Continued)

FOREIGN PATENT DOCUMENTS

| | | |
|---|---|---|
| CN | 1 965 598 | 5/2007 |
| CN | 102763378 | 10/2012 |

(Continued)

OTHER PUBLICATIONS

Ken Tang, et al., "MAC Layer Broadcast Support in 802.11 Wireless Networks," Computer Science Department, University of California, Los Angeles, 2000 IEEE, pp. 544-548.

(Continued)

*Primary Examiner* — Ricky Ngo
*Assistant Examiner* — Wei-Po Kao
(74) *Attorney, Agent, or Firm* — Lewis Roca Rothgerber LLP (57) ABSTRACT

Systems and methods for improving data transmission rates in communication networks are disclosed. In an 802.11 wireless communication network, where a source node of the wireless network transmits TCP data to a destination node of the wireless network, the destination node does not transmit TCP acknowledgments (ACKs) for the TCP data if 802.11 ACKs indicate that the destination node received the TCP data. If a source outside the wireless network transmits TCP data to the destination node within the wireless network through an intermediate device, such as an access point, the destination node suppresses transmitting TCP ACKs. The intermediate device transmits TCP ACKs as proxy for the destination node to the source. The intermediate device also suppresses TCP ACKs where a source node within the wireless network sends the TCP data to a destination node outside of the wireless network.

12 Claims, 6 Drawing Sheets

(51) Int. Cl.

| | | |
|---|---|---|
| *H04L 29/06* | (2006.01) | |
| *H04L 1/00* | (2006.01) | |
| *H04W 28/06* | (2009.01) | |
| *H04W 80/06* | (2009.01) | |
| *H04W 84/12* | (2009.01) | |
| *H04W 88/04* | (2009.01) | |
| *H04W 88/06* | (2009.01) | |

(52) U.S. Cl.
CPC .............. *H04W 80/06* (2013.01); *H04W 84/12* (2013.01); *H04W 88/04* (2013.01); *H04W 88/06* (2013.01)

(56) References Cited

U.S. PATENT DOCUMENTS

| | | |
|---|---|---|
| 4,193,077 A | 3/1980 | Greenberg et al. |
| 4,253,193 A | 2/1981 | Kennard |
| 4,305,052 A | 12/1981 | Baril et al. |
| 4,513,412 A | 4/1985 | Cox |
| 4,814,777 A | 3/1989 | Monser |
| 5,097,484 A | 3/1992 | Akaiwa |
| 5,117,430 A | 5/1992 | Berglund |
| 5,173,711 A | 12/1992 | Takeuchi et al. |
| 5,203,010 A | 4/1993 | Felix |
| 5,220,340 A | 6/1993 | Shafai |
| 5,220,678 A | 6/1993 | Feei |
| 5,361,256 A | 11/1994 | Doeringer |
| 5,373,548 A | 12/1994 | McCarthy |
| 5,408,465 A | 4/1995 | Gusella et al. |
| 5,507,035 A | 4/1996 | Bantz |
| 5,559,800 A | 9/1996 | Mousseau et al. |
| 5,570,366 A | 10/1996 | Baker |
| 5,608,726 A | 3/1997 | Virgile |
| 5,636,213 A | 6/1997 | Eastmond et al. |
| 5,754,145 A | 5/1998 | Evans |
| 5,767,809 A | 6/1998 | Chuang et al. |
| 5,802,312 A | 9/1998 | Lazaridis et al. |
| 5,867,109 A | 2/1999 | Wiedeman |
| 5,930,259 A | 7/1999 | Katsube |
| 5,940,771 A | 8/1999 | Gollnick et al. |
| 5,960,344 A | 9/1999 | Mahany |
| 5,964,830 A | 10/1999 | Durrett |
| 5,970,410 A | 10/1999 | Carney et al. |
| 5,974,034 A | 10/1999 | Chin et al. |
| 6,018,659 A | 1/2000 | Ayyagari et al. |
| 6,034,638 A | 3/2000 | Thiel et al. |
| 6,044,062 A | 3/2000 | Brownrigg et al. |
| 6,088,570 A | 7/2000 | Komara et al. |
| 6,094,177 A | 7/2000 | Yamamoto |
| 6,132,306 A | 10/2000 | Trompower |
| 6,181,697 B1 | 1/2001 | Nurenberg |
| 6,249,516 B1 | 6/2001 | Brownrigg et al. |
| 6,266,528 B1 | 7/2001 | Farzaneh |
| 6,266,537 B1 | 7/2001 | Kashitani et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,326,922 B1 | 12/2001 | Hegendoerfer |
| 6,337,628 B2 | 1/2002 | Campana, Jr. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,553 B1 | 3/2002 | Nagami et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,393,261 B1 | 5/2002 | Lewis |
| 6,404,386 B1 | 6/2002 | Proctor, Jr. et al. |
| 6,404,775 B1 | 6/2002 | Leslie et al. |
| 6,407,719 B1 | 6/2002 | Ohira et al. |
| 6,414,955 B1 | 7/2002 | Clare et al. |
| 6,418,138 B1 | 7/2002 | Cerf et al. |
| 6,442,507 B1 | 8/2002 | Skidmore et al. |
| 6,445,688 B1 | 9/2002 | Garces et al. |
| 6,493,679 B1 | 12/2002 | Rappaport et al. |
| 6,498,589 B1 | 12/2002 | Horii |
| 6,499,006 B1 | 12/2002 | Rappaport et al. |
| 6,505,253 B1 | 1/2003 | Chiu |
| 6,507,321 B2 | 1/2003 | Oberschmidt et al. |
| 6,570,883 B1 | 5/2003 | Wong |
| 6,584,080 B1 | 6/2003 | Ganz et al. |
| 6,625,454 B1 | 9/2003 | Rappaport et al. |
| 6,674,459 B2 | 1/2004 | Ben-Shachar et al. |
| 6,701,522 B1 | 3/2004 | Rubin et al. |
| 6,704,301 B2 | 3/2004 | Chari et al. |
| 6,714,551 B1 | 3/2004 | Le-Ngoc |
| 6,725,281 B1 | 4/2004 | Zintel et al. |
| 6,728,514 B2 | 4/2004 | Bandeira et al. |
| 6,753,814 B2 | 6/2004 | Killen et al. |
| 6,762,723 B2 | 7/2004 | Nallo et al. |
| 6,778,517 B1 | 8/2004 | Lou et al. |
| 6,779,004 B1 | 8/2004 | Zintel |
| 6,819,287 B2 | 11/2004 | Sullivan et al. |
| 6,836,481 B1 | 12/2004 | Hotta |
| 6,873,627 B1 | 3/2005 | Miller |
| 6,876,280 B2 | 4/2005 | Nakano |
| 6,888,504 B2 | 5/2005 | Chiang et al. |
| 6,888,893 B2 | 5/2005 | Li et al. |
| 6,892,230 B1 | 5/2005 | Gu et al. |
| 6,906,678 B2 | 6/2005 | Chen |
| 6,910,068 B2 | 6/2005 | Zintel et al. |
| 6,924,768 B2 | 8/2005 | Wu et al. |
| 6,931,429 B2 | 8/2005 | Gouge et al. |
| 6,941,143 B2 | 9/2005 | Mathur |
| 6,950,019 B2 | 9/2005 | Bellone et al. |
| 6,957,042 B2 | 10/2005 | Williams |
| 6,957,277 B2 | 10/2005 | Yagyu et al. |
| 6,961,028 B2 | 11/2005 | Joy et al. |
| 6,973,622 B1 | 12/2005 | Rappaport et al. |
| 6,975,834 B1 | 12/2005 | Forster |
| 6,996,086 B2 | 2/2006 | Wolfe et al. |
| 7,034,770 B2 | 4/2006 | Yang et al. |
| 7,043,277 B1 | 5/2006 | Pfister |
| 7,050,809 B2 | 5/2006 | Lim |
| 7,053,853 B2 | 5/2006 | Merenda et al. |
| 7,064,717 B2 | 6/2006 | Kaluzni et al. |
| 7,076,274 B2 | 7/2006 | Jollota et al. |
| 7,085,814 B1 | 8/2006 | Gandhi et al. |
| 7,089,307 B2 | 8/2006 | Zintel et al. |
| 7,113,519 B2 | 9/2006 | Hammel et al. |
| 7,130,895 B2 | 10/2006 | Zintel et al. |
| 7,136,655 B2 | 11/2006 | Skafidas et al. |
| 7,149,197 B2 | 12/2006 | Garahi et al. |
| 7,157,757 B2 | 1/2007 | Parekh et al. |
| 7,161,934 B2 | 1/2007 | Buchsbaum |
| 7,164,667 B2 | 1/2007 | Rayment et al. |
| 7,171,223 B2 | 1/2007 | Herscovich et al. |
| 7,171,475 B2 | 1/2007 | Weisman et al. |
| 7,187,925 B2 | 3/2007 | Abhishek |
| 7,203,508 B2 | 4/2007 | Ohkubo et al. |
| 7,269,174 B2 | 9/2007 | Olson et al. |
| 7,283,494 B2 | 10/2007 | Hammel et al. |
| 7,289,505 B2 | 10/2007 | Sanchez |
| 7,292,617 B2 | 11/2007 | Beasley et al. |
| 7,321,571 B2 | 1/2008 | Schnack et al. |
| 7,336,642 B2 | 2/2008 | Rich et al. |
| 7,355,997 B2 | 4/2008 | Qian |
| 7,362,737 B2 | 4/2008 | Behroozi |
| 7,369,510 B1 | 5/2008 | Wong |
| 7,489,932 B2 | 2/2009 | Chari et al. |
| 7,496,680 B2 | 2/2009 | Canright |
| 7,505,426 B2 | 3/2009 | Srikrishna et al. |
| 7,505,447 B2 | 3/2009 | Kish et al. |
| 7,515,589 B2 | 4/2009 | Bacher et al. |
| 7,522,731 B2 | 4/2009 | Kiemba et al. |
| 7,546,126 B2 | 6/2009 | Beasley et al. |
| 7,551,562 B2 | 6/2009 | Srikrishna et al. |
| 7,586,879 B2 | 9/2009 | Chari et al. |
| 7,672,274 B2 | 3/2010 | Bims |
| 7,697,504 B2 | 4/2010 | Chari et al. |
| 7,715,395 B2 | 5/2010 | Ginchereau et al. |

(56) References Cited

U.S. PATENT DOCUMENTS

| | | |
|---|---|---|
| 7,733,833 B2 | 6/2010 | Kalika et al. |
| 7,787,436 B2 | 8/2010 | Kish et al. |
| 7,853,829 B2 | 12/2010 | Younger et al. |
| 7,916,684 B2 | 3/2011 | Henderson et al. |
| 7,974,223 B2 | 7/2011 | Zelig et al. |
| 8,089,869 B2 | 1/2012 | Kisela et al. |
| 8,089,949 B2 | 1/2012 | Kish |
| 8,125,975 B2 | 2/2012 | Kish et al. |
| 8,355,343 B2 | 1/2013 | Kish et al. |
| 8,547,899 B2 | 10/2013 | Kish |
| 8,619,662 B2 | 12/2013 | Kish |
| 8,634,402 B2 | 1/2014 | Kish |
| 8,638,708 B2 | 1/2014 | Kish |
| 8,688,834 B2 | 4/2014 | Fujimoto et al. |
| 8,780,760 B2 | 7/2014 | Kish |
| 8,824,357 B2 | 9/2014 | Kish et al. |
| 9,019,886 B2 | 4/2015 | Kish |
| 9,066,152 B2 | 6/2015 | Kish |
| 9,071,942 B2 | 6/2015 | Kish |
| 2001/0047474 A1* | 11/2001 | Takagi et al. ................ 713/151 |
| 2001/0055312 A1* | 12/2001 | Negus ........................ 370/445 |
| 2002/0001310 A1 | 1/2002 | Mai |
| 2002/0031130 A1 | 3/2002 | Tsuchiya et al. |
| 2002/0036996 A1 | 3/2002 | Ozluturk et al. |
| 2002/0045435 A1* | 4/2002 | Fantaske ..................... 455/403 |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0114330 A1 | 8/2002 | Cheung et al. |
| 2002/0143951 A1 | 10/2002 | Khan |
| 2002/0158798 A1 | 10/2002 | Chiang et al. |
| 2002/0158801 A1 | 10/2002 | Crilly, Jr. et al. |
| 2002/0164963 A1 | 11/2002 | Tehrani et al. |
| 2002/0170064 A1 | 11/2002 | Monroe et al. |
| 2002/0194367 A1 | 12/2002 | Nakamura et al. |
| 2003/0003917 A1 | 1/2003 | Copley et al. |
| 2003/0026240 A1 | 2/2003 | Eyuboglu et al. |
| 2003/0026268 A1 | 2/2003 | Nava |
| 2003/0030588 A1 | 2/2003 | Kalis et al. |
| 2003/0043786 A1 | 3/2003 | Kall |
| 2003/0063591 A1 | 4/2003 | Leung et al. |
| 2003/0122714 A1 | 7/2003 | Wannagot et al. |
| 2003/0133458 A1 | 7/2003 | Sato et al. |
| 2003/0169330 A1 | 9/2003 | Ben-Shachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2003/0231593 A1 | 12/2003 | Bauman et al. |
| 2004/0008663 A1 | 1/2004 | Srikrishna |
| 2004/0014432 A1 | 1/2004 | Boyle |
| 2004/0017310 A1 | 1/2004 | Runkle et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0028006 A1 | 2/2004 | Kayama |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0080455 A1 | 4/2004 | Lee |
| 2004/0085993 A1 | 5/2004 | Wentink |
| 2004/0095278 A1 | 5/2004 | Kanemoto et al. |
| 2004/0114535 A1 | 6/2004 | Hoffmann et al. |
| 2004/0125777 A1 | 7/2004 | Doyle et al. |
| 2004/0190477 A1 | 9/2004 | Olson |
| 2004/0260800 A1 | 12/2004 | Gu et al. |
| 2004/0264463 A1 | 12/2004 | Fukushima |
| 2005/0002395 A1 | 1/2005 | Kondo |
| 2005/0009523 A1 | 1/2005 | Pekonen |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0074018 A1 | 4/2005 | Zintel et al. |
| 2005/0074019 A1 | 4/2005 | Handforth et al. |
| 2005/0097503 A1 | 5/2005 | Zintel et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0153720 A1 | 7/2005 | White et al. |
| 2005/0180381 A1 | 8/2005 | Retzer et al. |
| 2005/0185666 A1* | 8/2005 | Raya et al. ................... 370/461 |
| 2005/0188193 A1 | 8/2005 | Kuehnel et al. |
| 2005/0226239 A1* | 10/2005 | Nishida et al. ............... 370/389 |
| 2005/0232179 A1 | 10/2005 | Da Costa et al. |
| 2005/0240665 A1 | 10/2005 | Gu et al. |
| 2005/0250544 A1 | 11/2005 | Grant et al. |
| 2005/0267935 A1 | 12/2005 | Gandhi et al. |
| 2005/0271070 A1 | 12/2005 | Mikami et al. |
| 2006/0018335 A1 | 1/2006 | Koch |
| 2006/0045089 A1 | 3/2006 | Bacher et al. |
| 2006/0094371 A1 | 5/2006 | Nguyen |
| 2006/0098605 A1* | 5/2006 | Li .............................. 370/338 |
| 2006/0098607 A1 | 5/2006 | Zeng et al. |
| 2006/0098613 A1 | 5/2006 | Kish et al. |
| 2006/0114881 A1 | 6/2006 | Chari |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0133341 A1 | 6/2006 | Chari et al. |
| 2006/0165029 A1* | 7/2006 | Melpignano et al. ......... 370/328 |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0268881 A1* | 11/2006 | Moreton ....................... 370/394 |
| 2006/0280131 A1 | 12/2006 | Rahman et al. |
| 2006/0291434 A1 | 12/2006 | Gu et al. |
| 2007/0002750 A1 | 1/2007 | Sang |
| 2007/0010271 A1 | 1/2007 | Roy |
| 2007/0027622 A1 | 2/2007 | Cleron et al. |
| 2007/0030811 A1 | 2/2007 | Frei et al. |
| 2007/0072612 A1 | 3/2007 | Haraguchi et al. |
| 2007/0101020 A1 | 5/2007 | Lin et al. |
| 2007/0109961 A1 | 5/2007 | Liang |
| 2007/0135167 A1 | 6/2007 | Liu |
| 2007/0189283 A1 | 8/2007 | Agarwal et al. |
| 2007/0223451 A1 | 9/2007 | Ren et al. |
| 2007/0242602 A1 | 10/2007 | Pang et al. |
| 2007/0280168 A1 | 12/2007 | Shibata |
| 2008/0043638 A1 | 2/2008 | Ribiere |
| 2008/0069068 A1 | 3/2008 | Dean et al. |
| 2008/0137681 A1 | 6/2008 | Kish et al. |
| 2008/0137682 A1 | 6/2008 | Kish et al. |
| 2008/0159207 A1 | 7/2008 | Levine et al. |
| 2008/0225804 A1 | 9/2008 | Thubert |
| 2008/0247317 A1 | 10/2008 | Weil et al. |
| 2008/0247327 A1 | 10/2008 | Weil et al. |
| 2008/0267116 A1 | 10/2008 | Kang et al. |
| 2009/0019314 A1 | 1/2009 | Younger et al. |
| 2009/0028095 A1 | 1/2009 | Kish et al. |
| 2009/0040989 A1 | 2/2009 | Da Costa et al. |
| 2009/0067369 A1 | 3/2009 | Stamoulis |
| 2009/0073921 A1 | 3/2009 | Ji et al. |
| 2009/0080333 A1 | 3/2009 | Ozer et al. |
| 2009/0154359 A1 | 6/2009 | Strutt et al. |
| 2009/0180396 A1 | 7/2009 | Kish et al. |
| 2009/0207730 A1 | 8/2009 | Stamoulis et al. |
| 2009/0213730 A1 | 8/2009 | Zeng et al. |
| 2009/0225676 A1 | 9/2009 | Kisela et al. |

(56) References Cited

U.S. PATENT DOCUMENTS

| | | | |
|---|---|---|---|
| 2009/0262677 | A1 | 10/2009 | Banerjea et al. |
| 2010/0040056 | A1 | 2/2010 | Kobayashi |
| 2010/0085916 | A1 | 4/2010 | Yu et al. |
| 2010/0182944 | A1 | 7/2010 | Kish et al. |
| 2011/0096712 | A1 | 4/2011 | Kish et al. |
| 2011/0119360 | A1 | 5/2011 | Kish |
| 2011/0119401 | A1 | 5/2011 | Kish |
| 2011/0158233 | A1 | 6/2011 | Namgung |
| 2011/0216685 | A1 | 9/2011 | Kish et al. |
| 2012/0063379 | A1 | 3/2012 | Kish et al. |
| 2013/0010775 | A1 | 1/2013 | Kish et al. |
| 2013/0194969 | A1 | 8/2013 | Kish et al. |
| 2014/0016563 | A1 | 1/2014 | Kish |
| 2014/0071879 | A1 | 3/2014 | Kish |
| 2014/0133385 | A1 | 5/2014 | Kish |
| 2014/0175117 | A1 | 6/2014 | Kish |
| 2015/0312727 | A1 | 10/2015 | Kish |

FOREIGN PATENT DOCUMENTS

| | | |
|---|---|---|
| EP | 0352787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 653 664 | 5/2006 |
| EP | 2 350 863 | 8/2015 |
| GB | 2306278 | 4/1997 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| VN | 31159 | 10/2012 |
| WO | WO 02/25967 | 3/2002 |
| WO | WO0249360 A1 | 6/2002 |
| WO | WO 03/079484 | 9/2003 |
| WO | WO 2004/057817 | 7/2004 |
| WO | WO 2005/008938 | 1/2005 |
| WO | WO 2006/052639 | 5/2006 |
| WO | WO 2007/016326 | 2/2007 |
| WO | WO 2009/088488 | 7/2009 |
| WO | WO 2011/060454 | 5/2011 |
| WO | WO 2012/061531 | 5/2012 |

OTHER PUBLICATIONS

Ken Tang, et al., "MAC Reliable Broadcast in Ad Hoc Networks," Computer Science. Department, University of California, Los Angeles, 2001 IEEE, pp. 1008-1013.
Vincent D. Park, et al., "A Performance Comparison of the Temporally-Ordered Routing Algorithm and Ideal Link-State Routing," IEEE, Jul. 1998, pp. 592-598.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
Dell Inc., "How Much Broadcast and Multicast Traffic Should I Allow in My Network," PowerConnect Application Note #5, Nov. 2003.
Toskala, Antti, "Enhancement of Broadcast and Introduction of Multicast Capabilities in RAN," Nokia Networks, Palm Springs, California, Mar. 13-16, 2001.
Microsoft Corporation, "IEEE 802.11 Networks and Windows XP," Windows Hardware Developer Central, Dec. 4, 2001.
Festag, Andreas, "What is MOMBASA?" Telecommunication Networks Group (TKN), Technical University of Berlin, Mar. 7, 2002.
Hewlett Packard, "HP ProCurve Networking: Enterprise Wireless LAN Networking and Mobility Solutions," 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensornets with TCP/IP Networks," Proc. of the 2d Int'l Conf. on Wired Networks, Frankfurt, Feb. 2004.
Cisco Systems, "Cisco Aironet Access Point Software Configuration Guide: Configuring Filters and Quality of Service," Aug. 2003.
Hirayama, Koji et al., "Next-Generation Mobile-Access IP Network,"Hitachi Review vol. 49, No. 4, 2000.
Pat Calhoun et al., "802.11r strengthens wireless voice," Technology Update, Network World, Aug. 22, 2005, http://www.networkworld.com/news/tech/2005/082208techupdate.html.
Areg Alimian et al., "Analysis of Roaming Techniques," doc.:IEEE 802.11-04/0377r1, Submission, Mar. 2004.
Information Society Technologies Ultrawaves, "System Concept / Architecture Design and Communication Stack Requirement Document," Feb. 23, 2004.
Golmie, Nada, "Coexistence in Wireless Networks: Challenges and System-Level Solutions in the Unlicensed Bands," Cambridge University Press, 2006.
Mawa, Rakesh, "Power Control in 3G Systems," Hughes Systique Corporation, Jun. 28, 2006.
Wennstrom, Mattias et al., "Transmit Antenna Diversity in Ricean Fading MIMO Channels with Co-Channel Interference," 2001.
Steger, Christopher et al., "Performance of IEEE 802.11b Wireless LAN in an Emulated Mobile Channel," 2003.
Chang, Nicholas B. et al., "Optimal Channel Probing and Transmission Scheduling for Opportunistics Spectrum Access," Sep. 2007.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Hirayama et al., Next-Generation Mobil-Access IP Network, Hitachi Review, vol. 49 (2000), No. 4, pp. 176-179.
Hjalmtysson et al., Overcoming Last-Hop/First-Hop Problems in IP Multicast, Reykjavik University, Dept. of Computer Science, Ofanleiti 2, 103 Reykjavik, Iceland, (The Icelandic Centre for Research under grant No. 020500002.).
Visoottiviseth et al., Sender-Initiated Multicast Forwarding Scheme, Telecommunications, 2003, ICT 2003 10th International Conference, pp. 334-339, downloaded on Mar. 26, 2009 from IEEE Xplore, 0-7803-7661 (c) 2003 IEEE.
Tang et al., Mac Reliable Broadcast in Ad Hoc Networks, Computer Science Dept., University of California, Los Angeles, pp. 1008-1013, 0-7803-7225 (c) 2001 IEEE.
EP Application No. 10813061.8. Supplementary European Search Report dated Jul. 23, 2012.
U.S. Appl. No. 13/736,017 Office Action mailed Nov. 21, 2013.
CN Application No. 20058001629.7, Office Action dated Feb. 21, 2012.
U.S. Appl. No. 11/985,865, Office Action mailed Dec. 20, 2010.
U.S. Appl. No. 12/008,715, Office Action mailed Sep. 2, 2011.
U.S. Appl. No. 12/181,274, Office Action mailed Nov. 15, 2012.
U.S. Appl. No. 12/181,274, Office Action mailed Jun. 10, 2011.
U.S. Appl. No. 12/938,316, Office Action mailed Nov. 20, 2012.
U.S. Appl. No. 12/947,800, Office Action mailed Sep. 26, 2012.
Akyildiz et al., "Wireless mesh networks: a survey," Computer Networks, 2005.
Cato et al., "Method for Easier, Better, and Faster Site Surveys for Wireless Networks," IBM Technical Disclosure Bulletin, vol. 40, No. 1, 1997.
Chawla, "Design of a Wireless Backhaul Network for Microcells," 1999.
Fair queuing, http://en.wikipedia.org/wiki/fair_queuing. Aug. 11, 2008.
Gillham, Burce et al. JUNOSe Internet Software for E-Series Routing Platforms Policy and QoS Confirguaration Guide, Release 7.0x, Sep. 7, 2005.
Johansson et al., "Relaying Access Points and Related Business Models for Low Cost Mobile Systems," 2004.
Weighted Fair Queuing, http://en.wikipedia.org/wiki/Weighted_fair_queuing.

(56) References Cited

OTHER PUBLICATIONS

Weighted Round Robin, http:en.wikipedia.org/wiki/Weighted_round_robin.
Yanikomeroglu, "Cellular Multihop Communications: Infrastructure—Based Relay Network Architecture for 4G Wireless Systems," 2004.
PCT Search Report and Written Opinion for PCT/US08/014148 mailed Mar. 30, 2009.
PCT Search Report and Written Opinion for PCT/US11/059019 mailed Feb. 21, 2012.
PCT Search Report and Written Opinion for PCT/US05/039760 mailed Sep. 14, 2006.
PCT Search Report and Written Opinion for PCT/US10/56908 mailed May 3, 2011.
EP Application No. 10813061.8. Supplementary European Search Report dated Oct. 13, 2011.
TW Application No. 094138837, Office Action dated Apr. 25, 2013.
TW Application No. 094138837, Office Action dated Nov. 28, 2011.
U.S. Appl. No. 11/232,196, Office Action mailed May 15, 2008.
U.S. Appl. No. 11/232,196, Final Office Action mailed Dec. 26, 2007.
U.S. Appl. No. 11/232,196, Office Action mailed Apr. 5, 2007.
U.S. Appl. No. 11/267,477, Final Office Action mailed Oct. 6, 2010.
U.S. Appl. No. 11/267,477, Office Action mailed Jun. 16, 2010.
U.S. Appl. No. 11/267,477, Final Office Action mailed Jun. 10, 2009.
U.S. Appl. No. 11/267,477, Office Action mailed Sep. 25, 2008.
U.S. Appl. No. 11/985,866, Office Action mailed Dec. 16, 2009.
U.S. Appl. No. 11/985,866, Office Action mailed May 29, 2009.
U.S. Appl. No. 12/008,715, Final Office Action mailed Nov. 23, 2010.
U.S. Appl. No. 12/008,715, Office Action mailed Jun. 7, 2010.
U.S. Appl. No. 12/008,715, Office Action mailed Oct. 16, 2009.
U.S. Appl. No. 12/181,274, Final Office Action mailed Jun. 19, 2013.
U.S. Appl. No. 12/181,274, Final Office Action mailed Jan. 18, 2012.
U.S. Appl. No. 12/947,800, Final Office Action mailed Jul. 17, 2013.
U.S. Appl. No. 12/947,803, Final Office Action mailed Jul. 17, 2012.
U.S. Appl. No. 12/947,803, Office Action mailed Aug. 27, 2012.
Cato et aL, "Method for Easier, Better, and Faster Site Surveys for Wireless Networks," IBM Technical Disclosure Bulletin, vol. 40, No. 1, 1997.
Fair queuing, http://en.wikipedia.org/wiki/fair_queuing.
Gillham, Burce et al. JUNOSe Internet Software for E-Series Routing Platforms Policy and QoS Confirguaration Guide, Release 7.0x.
Johansson et aL, "Relaying Access Points and Related Business Models for Low Cost Mobile Systems," 2004.
PCT Search Report and Written Opinion for PCT/US05/039760 mailed May 3, 2011.
Chinese Application No. 201080002467.X, Second Office Action dated Jan. 26, 2015.
U.S. Appl. No. 14/160,402 Office Action mailed Oct. 22, 2014.
U.S. Appl. No. 14/080,488, Office Action mailed Oct. 21, 2014.
U.S. Appl. No. 14/028,323, Office Action mailed Oct. 14, 2014.
Chinese Application No. 20058001629.7, Office Action dated Jan. 21, 2014.
Chinese Application No. 201080002467.X, Office Action dated Jul. 3, 2014.
Chinese Application No. 20058001629.7, Office Action dated Aug. 6, 2014.
U.S. Appl. No. 14/106,514, Office Action mailed Sep. 22, 2014.
U.S. Appl. No. 14/028,323, Final Office Action mailed Jun. 12, 2015.
Taiwan Application No. 103106913, Office Action dated May 28, 2015.
U.S. Appl. No. 12/947,800, Office Action mailed Mar. 19. 2015.
U.S. Appl. No. 12/947,803, Office Action mailed Mar. 12, 2015.

\* cited by examiner

INCREASING RELIABLE DATA THROUGHPUT IN A WIRELESS NETWORK

CROSS REFERENCE TO RELATED APPLICATIONS

This application claims the benefit of U.S. Provisional Patent Application No. 60/625,331 entitled "Systems and Methods for Improved Data Throughput in Wireless Local Area Networks," filed on Nov. 5, 2004, the subject matter of which are hereby incorporated by reference. This application is related to co-pending U.S. patent application Ser. No. 11/010,076 entitled "System and Method for an Omnidirectional Planar Antenna Apparatus with Selectable Elements," filed on Dec. 9, 2004, U.S. patent application Ser. No. 11/022,080 entitled "Circuit Board Having a Peripheral Antenna Apparatus with Selectable Antenna Elements," filed on Dec. 23, 2004, and U.S. patent application Ser. No. 11/041,145 entitled "System and Method for a Minimized Antenna Apparatus with Selectable Elements," filed on Jan. 21, 2005, the subject matter of which are hereby incorporated by reference.

BACKGROUND OF THE INVENTION

1. Field of the Invention

The present invention relates generally to communication networks and more particularly to systems and methods for increased data throughput over communication networks, such as wireless networks.

2. Description of the Prior Art

Figure 1:
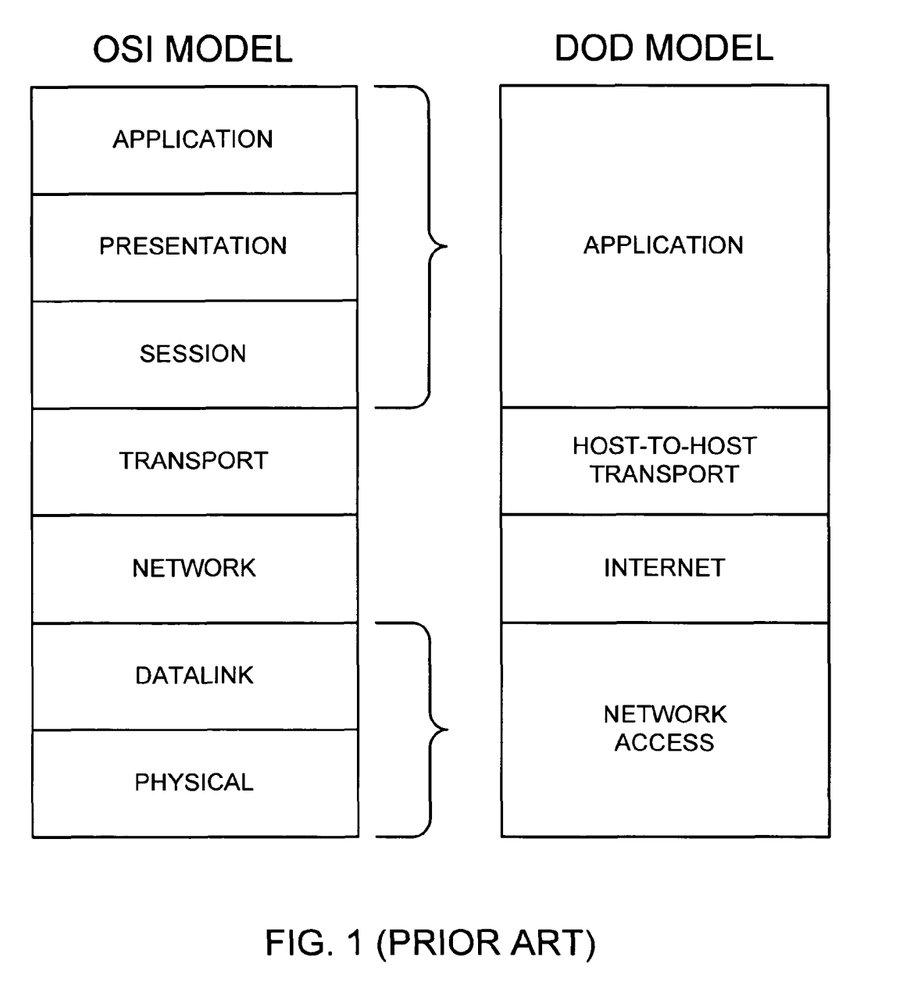
FIG. 1 illustrates a correlation between layers of the Open Systems Interconnection (OSI) Reference Model and the Department of Defense (DoD) Reference Model, according to the prior art.

A reference model can conveniently represent communication between networked devices. FIG. 1 illustrates a correlation between layers of the Open Systems Interconnection (OSI) Reference Model and the Department of Defense (DoD) Reference Model, according to the prior art. The Department of Defense Model (DoD) model and the Open Systems Interconnection (OSI) model are two standardized reference models which are well known to those skilled in the art.

These reference models represent communications as processes which occur in a hierarchy of higher and lower layer protocols. In general, each layer communicates with a higher layer protocol and a lower layer protocol. As indicated by FIG. 1, the DoD model includes four layers, a network access layer, an internet layer, a host-to-host transport layer (the transport layer), and an applications layer.

Figure 2:
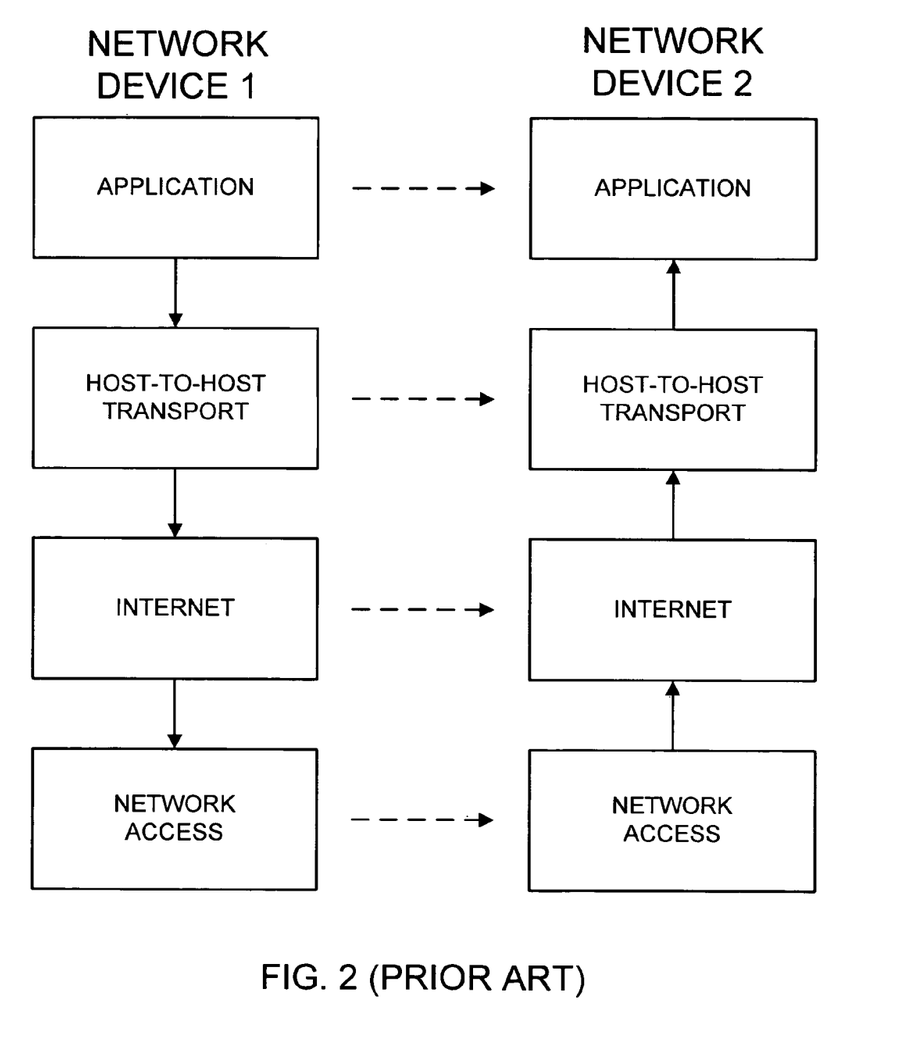
FIG. 2 illustrates physical and virtual data flow at the various layers in the DoD Reference Model during communication between two network devices, according to the prior art.

FIG. 2 illustrates physical and virtual data flow at the various layers in the DoD Reference Model during communication between two network devices, according to the prior art. Each layer in a first network device communicates with the corresponding layer in a second network device. The communication between layers is represented by dashed lines, the embedding of information in successive lower layer protocols at the first network device is represented by downward arrows between layers, and the un-packaging of information by successive higher layer protocols at the second network device is represented by upward arrows between layers.

For instance, the communication between the network devices in the transport layer (i.e., the higher layer protocol) is embedded into a communication in the internet layer (i.e., the lower layer protocol for the transport layer protocol) of each device. Physical data transfer is ultimately made at the lowest layer protocol in the hierarchy of the reference model. In the DoD network reference model, the lowest layer protocol is the network access layer.

The network access layer comprises media access control services and protocols (which attach physical source and destination addresses, e.g., Ethernet addresses, and control protocols), and the physical medium, for example, copper cables or RF specifications such as the type of modulation. To achieve compatibility and interoperability of equipment manufactured by various different vendors, communication networks often rely on standard specifications for the network access layer. In one example, in 1997, the Institute of Electrical and Electronics Engineers (IEEE) 802 Group established the 802.11 wireless standard specifying media access (MAC) services, protocols, and an RF physical layer for wireless communication. This protocol is now in widespread use for wireless networks. For example, in an IEEE 802.11 network, an access point (e.g., a base station) communicates data with a remote receiving node (e.g., a mobile station such as a laptop computer configured with a network interface card) over a wireless link such as a radio frequency (RF) baseband wireless link.

Generally, wireless transmissions tend to be more susceptible to data losses than other forms of data transmission. Wireless transmission can be unreliable because of problems such as interference, signal attenuation, and multi-path reflections of radio signals. For example, 802.11b and 802.11g wireless local area networks (LANs) communicate by way of a 2.45 GHz frequency band which often has interfering radiation from mobile phones, microwave ovens and other 802.11 networks. To address this problem, the 802.11 specification comprises mechanisms to enable reliable communication despite the presence of interference.

In the present context, a transmission protocol is "reliable" if the protocol provides for verification that the receiving node received the data. One mechanism by which an 802.11 wireless access point provides reliable communication with an associated receiving node is with 802.11 acknowledgments (ACKs). A unicast 802.11 packet is acknowledged by the receiving node via an 802.11 ACK following a successful reception. If the access point does not detect the 802.11 ACK within a set period of time, the unicast 802.11 packet is presumed to have been lost and is therefore retransmitted by the access point. However, by implementing a reliable lower layer protocol, the transmission of 802.11 ACKs limits data transmission rates over communication networks because for successfully received unicast 802.11 packets, the 802.11 ACKs are transmitted in return.

A higher layer protocol that implements reliable transmission potentially further limits the data transmission rates when implemented on a communication network that provides a reliable lower layer protocol, such as the wireless network. For example, the transport layer of the DoD reference module typically includes reliable connection oriented protocols, such as TCP, for the exchange of data between a sender and a receiver. TCP assures reliable delivery of data services between the sender and the receiver (i.e., the source and destination) using several mechanisms. After a predefined amount of data is transmitted from the sender to the receiver, the sender must wait for a TCP acknowledgment (ACK) in the transport layer back from the receiver to confirm that the data was received. The sender is not allowed to transmit additional data until it receives this ACK, and if the sender does not receive the ACK within a predetermined time, it must retransmit the data.

Figure 3:
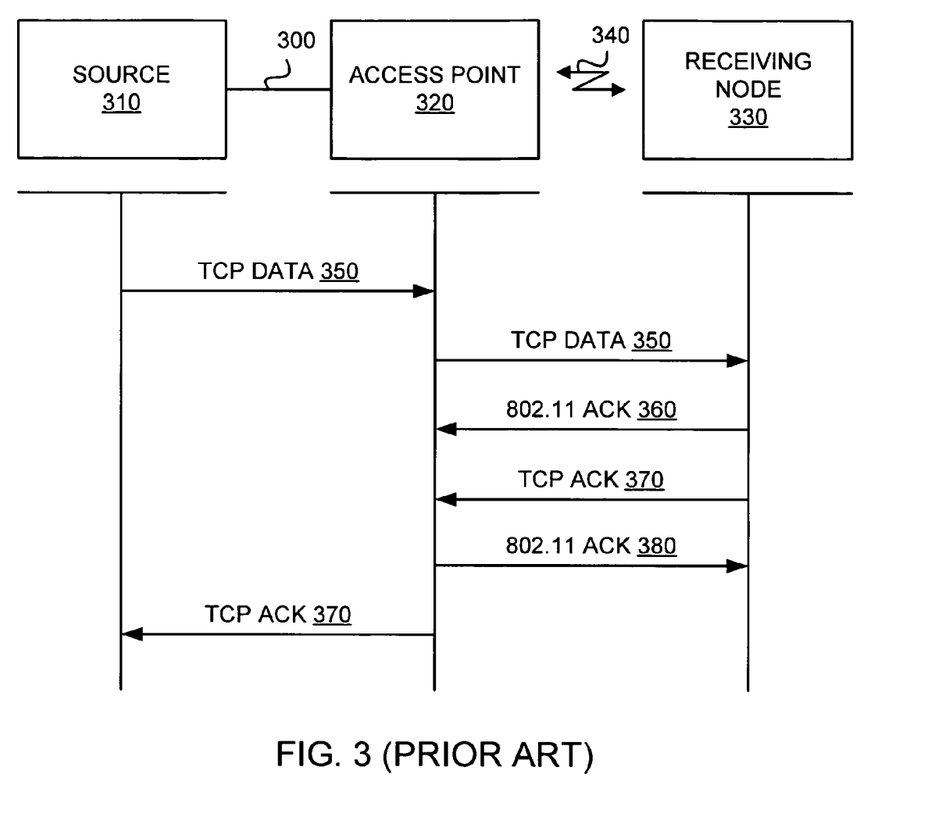
FIG. 3 illustrates transmission of TCP and 802.11 acknowledgments for TCP data transmitted from a source to a receiving node, according to the prior art.

FIG. 3 illustrates transmission of TCP and 802.11 acknowledgments for TCP data 350 transmitted from a source 310 to a receiving node 330, according to the prior art. The source node 310 transmits the TCP data 350 to an access point 320 over a wired network 300. The access point 320 then transmits the TCP data 350 (e.g., encapsulated in an 802.11 packet) over a wireless link 340 to the receiving node 330. If the receiving node 330 successfully receives the TCP data 350, the receiving node 330 transmits an 802.11 ACK 360 to the access point 320.

The receiving node 330 then transmits a TCP ACK 370 to the source 310 through the access point 320. The access point 320 acknowledges receipt of the TCP ACK 370 by another 802.11 ACK 380. The access point 320 finally transmits the TCP ACK 370 to the source 310.

Therefore, the TCP ACKs (e.g., the TCP ACK 370) are particularly burdensome in the 802.11 wireless LAN because multiple acknowledgments, (i.e., TCP ACKs and 802.11 ACKs) are sent to acknowledge receipt of the same communication (i.e., the TCP data 350). A wireless network, such as an IEEE 802.11 network, may provide a relatively high maximum physical data rate, for example 54 Mbps. However, because TCP packet headers and other protocol content is transmitted over the wireless link along with application layer data, in practice, the TCP data transfer rate corresponding to a 54 Mbps rate of physical transmission between physical IEEE 802.11g network devices is only about 24 Mbps. Hence, protocol overhead comprises about 50% of the application layer data rate.

Additionally, data transmission between a TCP source and a TCP destination is often unidirectional. For example, applications such as web browsers commonly receive large amounts of data from a remote website while sending little or no data back to the site. Accordingly, the TCP data transmission is often unidirectional over short intervals, and the TCP ACKs from the receiver to the sender typically carry no TCP data.

One limitation is that the protocol overhead for sending the TCP ACKs from the receiver to the sender burdens the physical communication channel when there is no actual TCP data being transferred from the receiver to the sender. Furthermore, much of this overhead is typically repeated for each TCP ACK. As a result, much of the time used to send 802.11 data packets is taken up with sending encapsulated TCP ACKs that have no accompanying TCP data and accompanying 802.11 ACKs. The multiple TCP ACKs and 802.11 ACKs increase network traffic over the communication network and limit bandwidth for the transfer of the data.

SUMMARY

The present invention provides systems, devices, and methods for throughput enhancement by acknowledgment suppression. A method comprises transmitting data according to a higher layer protocol from a source to a destination through an intermediate device between the source and the destination, transmitting a first acknowledgment according to a lower layer protocol from the destination to the intermediate device, and transmitting a second acknowledgment according to the higher layer protocol to the source from the intermediate device based on the first acknowledgment. The destination may comprise a node of a wireless network. The intermediate device may comprise an access point of the wireless network.

In some embodiments, the higher layer protocol comprises TCP, a reliable connection oriented protocol, and the second acknowledgment comprises a TCP ACK. The lower layer protocol may comprise an 802.11 protocol, and the first acknowledgment comprises an 802.11 ACK.

Another method comprises transmitting data according to a higher layer protocol from a source to a destination, transmitting a first acknowledgment to the source according to a lower layer protocol from an intermediate device between the source and the destination, transmitting a second acknowledgment according to the higher layer protocol from the destination to the intermediate device, and suppressing the second acknowledgment at the intermediate device. In some embodiments, the source comprises a node of a wireless network. The intermediate device may comprise an access point of a wireless network. In some embodiments, suppressing the second acknowledgment comprises not transmitting the second acknowledgment to the source.

Still another method of the invention comprises transmitting data according to a higher layer protocol from a source to a destination through an intermediate device between the source and the destination, transmitting a first acknowledgment to the source according to a lower layer protocol from the intermediate device, and transmitting a second acknowledgment according to the lower layer protocol to the intermediate device from the destination.

A wireless local area network (LAN) device, such as an access point, is further provided. The device comprises logic configured to transmit data according to a higher layer protocol from a source to a destination, receive a first acknowledgment according to a lower layer protocol from the destination, and transmit a second acknowledgment according to the higher layer protocol to the source based on the first acknowledgment. In these embodiments, the logic may be embodied in any combination of hardware, software, and firmware elements. In some embodiments, the device is further configured to broadcast a beacon advertising a capability to generate TCP acknowledgments based on 802.11 acknowledgments.

Another wireless LAN device of the invention comprises logic configured to receive data according to a higher layer protocol from a source, transmit a first acknowledgment to the source according to a lower layer protocol, and not send a higher layer protocol acknowledgment to the source in response to receiving the data. In some embodiments, the wireless LAN device comprises a receiving node. The source in communication with the wireless LAN device may comprise an access point.

BRIEF DESCRIPTION OF THE DRAWINGS

The present invention will be described with reference to drawings that represent preferred embodiments of the invention. These embodiments are intended to illustrate without limiting the invention. Other embodiments will become apparent from the following drawings.

DETAILED DESCRIPTION

The present invention is directed to methods for improving data transmission rates in communication networks through the reduction of acknowledgment transmissions, and to systems and devices that are configured to enable the methods. Specifically in an exemplary wireless network, when a node of the wireless network is transmitting TCP data over a wireless link to a destination, TCP acknowledgments (ACKs) without data or other flag bits are not sent over the wireless link if 802.11 ACKs are sufficient to inform the node that the TCP data has been properly received by the destination. If the TCP data originates outside of the wireless network and is being sent to a destination within the wireless network, the destination suppresses the TCP ACKs and an access point of the wireless network sends the TCP ACKs to the originator. If the TCP data originates within the wireless network and is being sent out of the wireless network, the access point of the wireless network suppresses the TCP ACKs. If the TCP data is being sent between nodes in the wireless network, both the access point and the destination node suppress TCP ACKs. Accordingly, some embodiments of the present invention provide access points and wireless nodes that are configured to selectively suppress TCP ACKs when appropriate.

Figure 4:
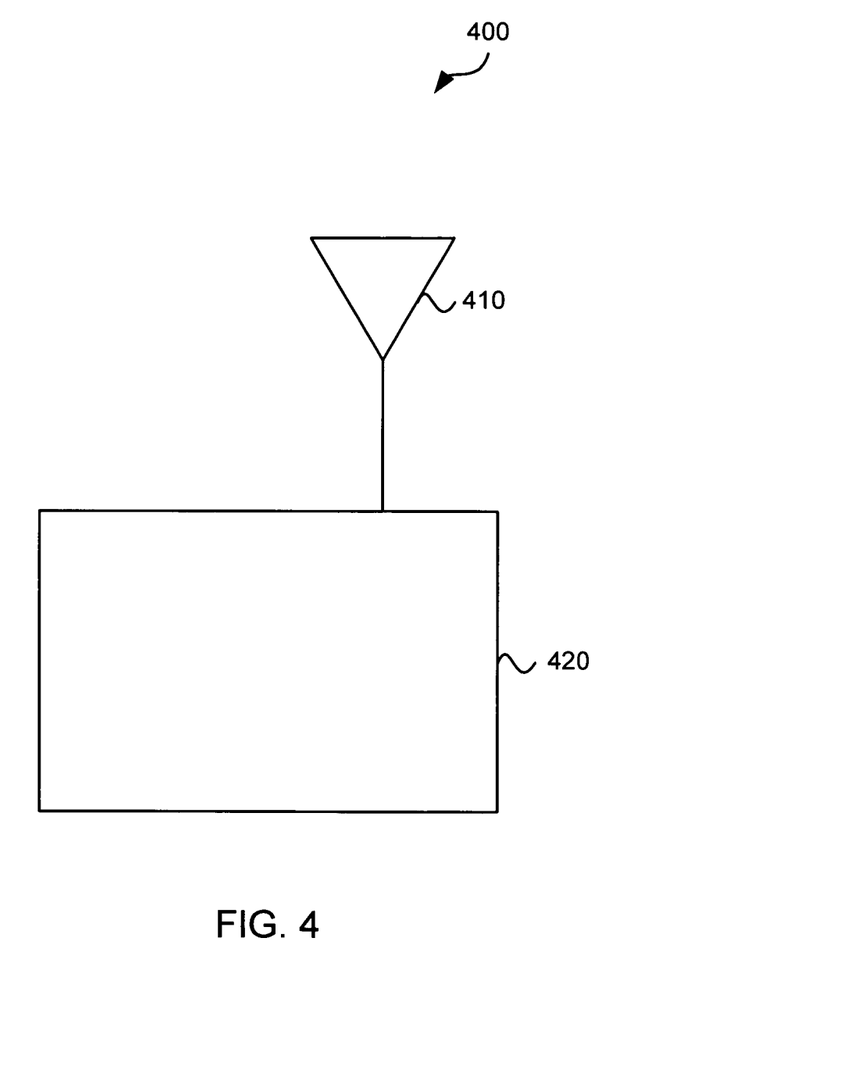
FIG. 4 illustrates an exemplary wireless local area network device, according to an embodiment of the present invention.

FIG. 4 illustrates an exemplary wireless local area network (LAN) device 400 comprising an antenna apparatus 410 and an 802.11g RF communication apparatus 420, according to one embodiment of the present invention. The wireless LAN device 400 can be, for example, a transmitter and/or a receiver, such as an 802.11 access point, a set-top box, a laptop computer, a television, a PCMCIA card, a remote control, and a remote terminal such as a handheld gaming device. In an exemplary embodiment, the wireless LAN device 400 comprises an access point for communicating to one or more remote receiving nodes over a wireless link (not shown), for instance, by way of TCP/IP in an 802.11 wireless network.

Typically, the wireless LAN device 400 receives data from a router (not shown) connected to the Internet, and the wireless LAN device 400 exchanges the data via the wireless link with one or more remote receiving nodes (not shown). The wireless LAN device 400 can also form a part of a wireless LAN by enabling communications among the one or more remote receiving nodes. Although the disclosure focuses on specific embodiments for the wireless LAN device 400, aspects of the invention are applicable to a wide variety of devices for exchanging information via a communication network, and are not intended to be limited to the specifically disclosed embodiments.

In one embodiment, the wireless LAN device 400 includes the antenna apparatus 410, the 802.11g RF communication apparatus 420 (e.g., a transceiver), and a processor (not shown) running software to control the communication apparatus 420 and/or the antenna apparatus 410. The communication apparatus 420 can be essentially any device for generating and/or receiving an RF signal. The communication apparatus 420 may include, for example, a radio modulator/demodulator for converting data received into the wireless LAN device 400 (e.g., from the router) into an RF signal for transmission to one or more of the remote receiving nodes. In some embodiments, the communication apparatus 420 comprises circuitry for receiving data packets of video from the router and circuitry for converting the data packets into 802.11 compliant RF signals. Additionally, the principles of the invention apply to an access point with a single antenna, or an access point with two omnidirectional "whip" antennas.

Figure 5:
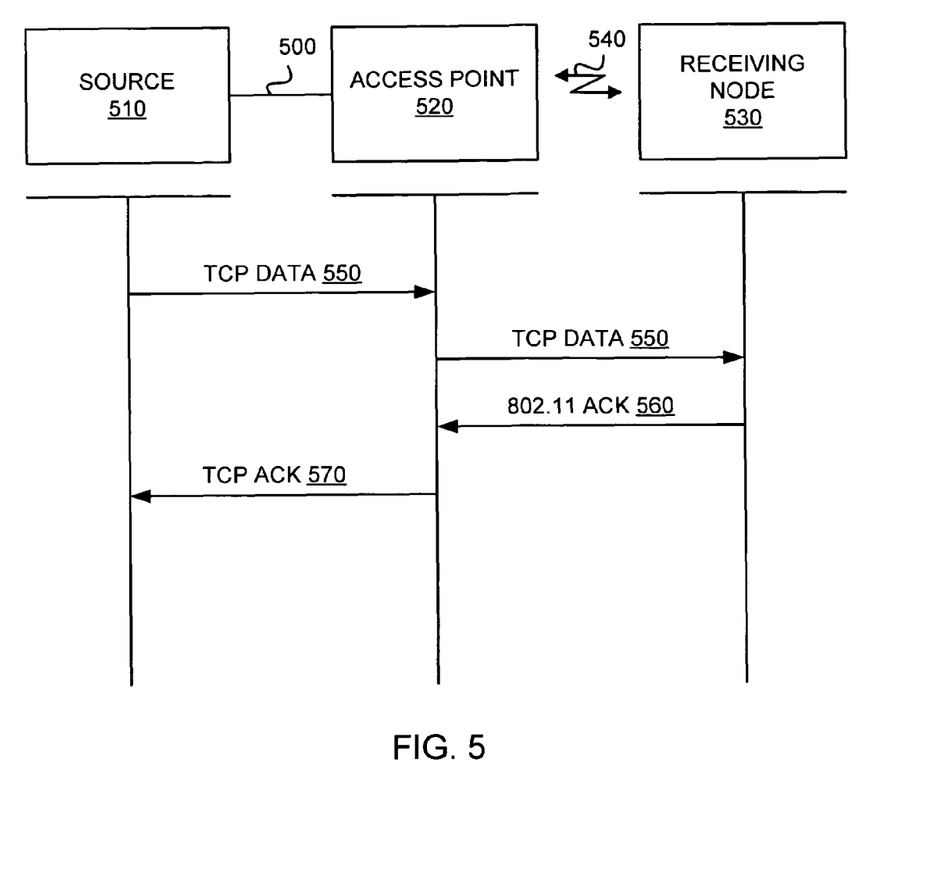
FIG. 5 illustrates transmission of TCP and 802.11 acknowledgments for TCP data transmitted from a source to a receiving node, according to an embodiment of the present invention.

FIG. 5 illustrates transmission of TCP and 802.11 acknowledgments for TCP data 550 transmitted from a source 510 to a receiving node 530, according to an embodiment of the present invention. A wired network 500 connects the source 510 to an access point 520 (e.g., such as the wireless LAN device 400 of FIG. 4). A wireless network 540 connects the access point 520 to the receiving node 530. An exchange of data between the source 510, the access point 520, and the receiving node 530 is schematically illustrated below the representation of the devices 510, 520, and 530.

The source 510 transmits the TCP data 550 destined for the receiving node 530. To reach the receiving node 530, the source 510 transmits the TCP data 550 over the wired network 500 to the access point 520. In one example, an unreliable wired network access protocol, such as, 802.3 Ethernet, may be used to transmit the TCP data 550 via the wired network 500.

After the access point 520 converts the TCP data 550 into an 802.11 frame, the access point 520 transmits the 802.11 frame comprising the TCP data 550 to the receiving node 530. Subsequently, the receiving node 530 transmits an 802.11 ACK 560 to the access point 520. Upon receiving the 802.11 ACK 560, the access point 520 has sufficient information to determine that the receiving node 530 received the TCP data 550 without error. The access point 520 then transmits a TCP ACK 570 over the wired network 500 to the source 510.

The access point 520 advantageously provides that if the access point 520 receives the 802.11 ACK 560, then the receiving node 530 received the TCP data 550 without error. Accordingly, the access point 520 and the receiving node 530 may not exchange multiple ACKs for the TCP data 540. Thus, according to one embodiment, the receiving node 530 does not send a TCP ACK to acknowledge the TCP data 550. In some embodiments, the receiving node 530 generates the TCP ACK, but is configured to suppress the TCP ACK from the transmission at the lower layer protocol. In other embodiments, the receiving node 530 is configured to not generate the TCP ACK. Not sending the TCP ACK frees the wireless link 540 for other transmissions.

Although the explanation of the embodiment shown in FIG. 5 is in terms of TCP data sent from the source 510 to the receiving node 530, similar issues exist when TCP data is sent from the receiving node 530 to the source 510 by way of the access point 520. Therefore, according to one embodiment, when TCP data is transmitted from the receiving node 530 to the access point 520 via the wireless link 540, an 802.11 ACK returned to the receiving node 530 is sufficient to inform the receiving node 530 that the TCP data was received by the access point 520.

The TCP data is then sent to the source 510 over the wired network 500. The source 510 then returns a TCP ACK to the access point 520. The TCP ACK from the source 510 is then suppressed by the access point 520. Suppressing the TCP ACK at the access point 520, advantageously, prevents the transmission of the TCP ACK to the receiving node 530 and the subsequent transmission of another 802.11 ACK back to the access point 520 from the receiving node 530 in response to the received TCP ACK.

Generally, in a TCP network, a proxy that synthesizes ("spoofs") a TCP ACK from an intended destination must take responsibility for delivering the TCP data to the intended destination. It is generally necessary for the proxy (the "spoofer") to retain the TCP data until the TCP data has been received and acknowledged by the destination. Once the source receives an acknowledgment that the TCP data has been received by the destination, the source can delete the TCP data from its transmission buffer. Thus, when the source receives a spoofed TCP ACK from the proxy before the data is actually delivered to the destination, the source can proceed as if the data had actually been delivered. Generally, the spoofed TCP ACK allows the sender to send more data to the proxy.

In this sense, the system of FIG. 5 is generally configured for using 802.11 ACKs as a proxy for TCP ACKs. Reducing the number of TCP ACKs that are sent over the wireless link 540 improves TCP data throughput across the wireless link 540. The access point 520 and receiving node 530 can be thought of as comprising a distributed proxy.

In one embodiment, the access point 520 and the receiving node 530 handshake during an initial association to enable the suppression of TCP ACKs and to enable the access point 520 to spoof the suppressed TCP ACKs to the source 510 based on 802.11 ACKs from the receiving node 530. The initial association includes an exchange of information between the access point 520 and the receiving node 530 to indicate, by way of example, that the access point 520 is capable of supporting 54 Mbps physical layer rate communications.

In another embodiment, the access point 520 broadcasts a beacon advertising its capability to generate TCP ACKs based on 802.11 ACKs. If the receiving node 530 elects to use this capability to increase the capacity for TCP data transmission over the wireless link 540, the receiving node 530 will signal this capability in an 802.11 association request sent to the access point 520. Thereafter, the receiving node 530 and the access point 520 can cooperatively suppress TCP ACKs that originate either from the transport layer in the receiving node 530 or in the source 510.

After successful completion of the 802.11 association handshake, wireless 802.11 frames comprising TCP ACKs in all TCP communications transmitted across the wireless link 540 will be suppressed by spoofing the TCP ACKs from the 802.11 ACKs as described above. A benefit of the handshaking is that the access point 520 can differentiate a receiving node (not shown) that does not support TCP ACK suppression from the receiving node 530 that does. By suppressing TCP ACKs, TCP data transmission capacity in an 802.11g network can be improved by up to 30% over that of the prior art. In some embodiments, actual data throughput is increased from 24 Mbps to 30 Mbps in the 54 Mbps 802.11g physical data rate mode.

In some embodiments, it may be advantageous to suspend TCP ACK suppression, even though the access point 520 and receiving node 530 have the suppression capability. For example, when a TCP data stream is transmitted from the receiving node 530 to the source 510 via the access point 520, the access point 520 may buffer the TCP data stream until a TCP ACK returned by the source 510 towards the receiving node 530 is received by the access point 520. In order to sustain TCP ACK suppression between the access point 520 and the receiving node 530, the access point 520 may require a very high capacity buffer to store the accumulated TCP data stream from the receiving node 530. In particular, this will be the case if the TCP data stream from the access point 520 to the source 510 is interrupted, for example, due to a network problem between the access point 520 and the source 510.

In one embodiment, to reduce the buffering required by the access point 520, the access point 520 avoids suppressing TCP ACKs even though it has the capability to do so. In other embodiments, the access point 520 suppresses TCP ACKs for only a limited number of data packets. In some embodiments, the access point 520 may reduce data transmission rates over the wireless link 540, or may stop generating 802.11 ACKs to the receiving node 530, as data buffers in the access point 520 become full.

Figure 6:
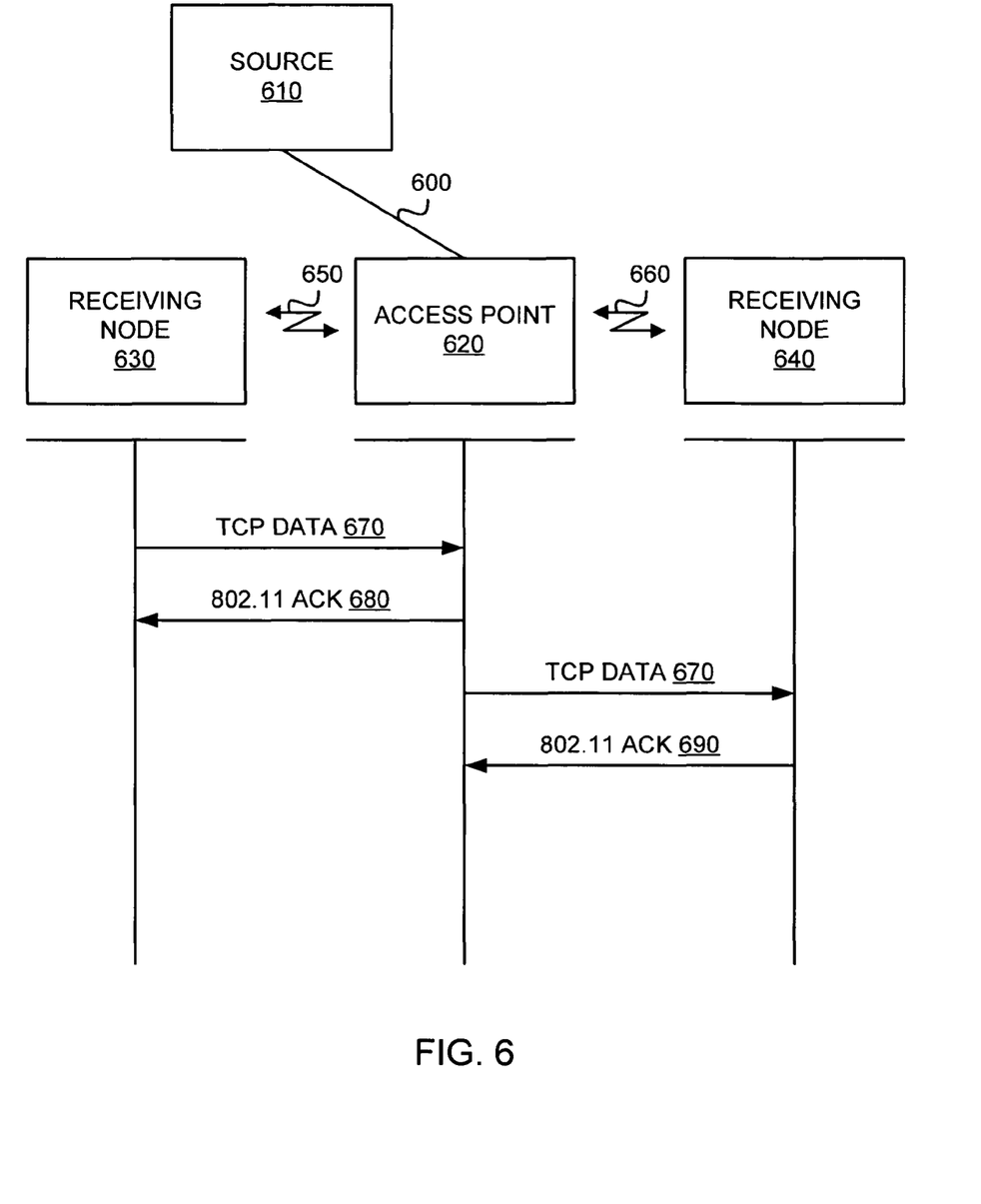
FIG. 6 illustrates transmission of TCP and 802.11 acknowledgments for TCP data transmitted between two receiving nodes of a wireless network, according to an embodiment of the present invention.

FIG. 6 shows transmission of TCP and 802.11 acknowledgments between two nodes of a wireless network according to an embodiment of the present invention. A wired network 600 connects a source 610 to an access point 620. A wireless link 650 connects the access point 620 to a receiving node 630. A wireless link 660 connects the access point 620 to a receiving node 640. An exchange of data between the receiving nodes 630 and 640 and the access point 620 is schematically illustrated below the representation of the devices 620, 630, and 640.

The access point 620 may buffer TCP data between the receiving node 630 and the receiving node 640. The access point 620 may also operate as a proxy between the receiving node 630 and the receiving node 640. When the access point 620 operates solely as a buffer, the receiving node 630 transmits TCP data 670 to the access point 620. The access point 620 then returns an 802.11 ACK 680 to the receiving node 630 to acknowledge the receipt of the TCP data 670. The access point 620 then transmits the TCP data 670 to the receiving node 640. The receiving node 640 transmits an 802.11 ACK 690 to the access point 620. In this situation, as compared to the prior art, a TCP ACK and an 802.11 ACK are eliminated both between the access point 620 and the receiving node 630, and between the receiving node 640 and the access point 620.

As described herein, the access point 620 can act to prevent an overflow of the data buffers in the access point 620. The access point 620 can suspend TCP ACK suppression entirely with the receiving nodes 630 and 655. Alternatively, the access point 620 can operate as a proxy between the receiving node 630 and the receiving node 640. In this mode of operation, the access point 620 generates a TCP ACK from the receiving node 640 to the receiving node 630 based on the 802.11 ACK 690 received from the receiving node 640. The access point 620 transmits the spoofed TCP ACK to the receiving node 630. The access point 620 may further moderate data transmission rates and TCP ACK suppression based on a degree of buffer fullness.

In general, the access point 620 may not suppress TCP segments that comprise data in addition to an acknowledgment (ACK flag set). Furthermore, in some embodiments, the access point 620 may not suppress TCP segments comprising the three-part "handshake" which initiates a TCP connection (a first TCP segment with only the synchronize (SYN) flag set, followed by a second reply TCP segment with both flags SYN and ACK set, and then a third TCP ACK confirming receipt of the SYN/ACK reply). TCP segments including certain TCP control flags, for example, the urgent pointer field (URG), the synchronize no more data (SYN FIN), and the reset connection (RST) flags are not suppressed in some embodiments. However, not all TCP implementations are the same and selected segments comprising these flags or data may be suppressed in some embodiments.

Although the present invention has been described with respect to the 802.11 wireless protocols, the principles of the invention also apply to generating an acknowledgment for a reliable higher layer protocol based on any lower layer protocol that supports reliable data transmission. Additionally, although the present invention has been described with respect to the TCP protocol, the invention also applies to any higher layer protocol that supports reliable data transmission.

For example, referring to again to FIG. 5, in one embodiment, the source 510 includes a Trivial File Transfer Protocol (TFTP) server. The TFTP protocol provides a reliable application layer protocol (i.e., the higher layer protocol) generally implemented on top of User Datagram Protocol (UDP). The receiving node 530 may request a file from the source 510 by communicating with the TFTP server. The source 510 sends the file by sending a UDP packet (in place of the TCP data 550) through the access point 520 and over the wireless link 540 to the receiving node 530. The receiving node 530, upon successful reception of the UDP packet over the wireless link 540, transmits the 802.11 ACK 560 to the access point 520.

The receiving node 530 does not send an ACK for the UDP packet because the UDP protocol does not provide reliable transmission through acknowledgments. However, the receiving node 530 may send a TFTP ACK according to the TFTP higher layer protocol. According to the principles of the invention, the receiving node 530 may suppress transmission of the TFTP ACK because the 802.11 ACK 560 was already sent. The access point 520 then may send a TFTP ACK (in place of the TCP ACK 570) to the source 510 to acknowledge reception of the file. Advantageously, the access point 520 may generate a higher layer protocol acknowledgment (e.g., the TFTP application layer ACK) based on the lower layer protocol acknowledgment (e.g., the 802.11 ACK 560).

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for reliably transmitting data from a source to a destination in a wireless network, the method comprising:
    transmitting data from the source to the destination, the data transmitted according to a higher layer protocol that includes the transmission control protocol (TCP);
    receiving a first acknowledgment at the source, wherein the first acknowledgment is transmitted from an intermediate device between the source and the destination, wherein the first acknowledgment is transmitted according to a lower layer protocol that includes an 802.11 protocol, wherein the first acknowledgment includes an 802.11 acknowledgment (802.11 ACK); and
    suppressing any further transmission of acknowledgements in the wireless network at the source from the intermediate device, wherein the suppression is based on a transmission of a second acknowledgement from the destination to the intermediate device, wherein the second acknowledgement is transmitted according to the higher layer protocol and includes a transmission control acknowledgement (TCP ACK), and wherein the transmission of data in the wireless network from the source to the destination nevertheless remains reliable and occurs without delay of additional acknowledgment transmissions to the source from the intermediate device as a result of the first acknowledgment being transmitted according to the lower layer protocol and the second acknowledgment being transmitted according to the higher layer protocol.

2. The method of claim 1, wherein the intermediate device includes an access point for a wireless network.

3. The method of claim 1, wherein suppressing the second acknowledgment is a result of not transmitting the second acknowledgment to the source.

4. The method of claim 1, wherein the source of the data originates outside the wireless network.

5. The method of claim 1, wherein the source of the data originates within the wireless network.

6. The method of claim 1, wherein the destination of the data is outside the wireless network.

7. The method of claim 1, wherein the destination of the data is within the wireless network.

8. The method of claim 1, further comprising determining that the destination received the transmitted data from the source without error.

9. The method of claim 1, further comprising receiving a proxy acknowledgement at the source from the intermediate device thereby instructing the source that additional data may be transmitted to the source.

10. The method of claim 1, wherein the second acknowledgement between the intermediate device and the destination includes an exchange of operation-based information.

11. The method of claim 1 further comprising broadcasting operation-based information of the intermediate device, wherein the broadcasted information can be received by the destination to adjust operation of the destination.

12. The method of claim 1, wherein the second acknowledgement from the destination to the intermediate device includes information used by the intermediate device to determine that the destination supports acknowledgement suppression.

* * * * *